(12) United States Patent  
Blanchet et al.

(10) Patent No.: US 6,902,840 B2  
(45) Date of Patent: Jun. 7, 2005

(54) FUEL CELL SYSTEM WITH MIXER/EDUCTOR

(75) Inventors: Scott Blanchet, Monroe, CT (US); Pinakin Patel, Danbury, CT (US)

(73) Assignee: FuelCell Energy, Inc., Danbury, CT (US)

( * ) Notice: Subject to any disclaimer, the term of this patent is extended or adjusted under 35 U.S.C. 154(b) by 439 days.

(21) Appl. No.: 10/187,495

(22) Filed: Jul. 2, 2002

(65) Prior Publication Data

US 2004/0005491 A1 Jan. 8, 2004

(51) Int. Cl.[7] .......................... H01M 2/00; H01M 2/02; H01M 8/04; H01M 8/12
(52) U.S. Cl. .............. 429/34; 429/22; 429/25
(58) Field of Search ................ 429/17, 23, 19, 429/26, 34, 37, 20, 25, 129, 13, 22, 14; 48/107, 61, 127.9; 95/54; 423/478; 431/184; 205/784; 518/704; 204/164

(56) References Cited

U.S. PATENT DOCUMENTS 3,516,807 A  *  6/1970  Gray et al. ................... 48/107
3,607,419 A  *  9/1971  Keating, Jr. .................. 429/17
5,441,821 A  *  8/1995  Merritt et al. ................ 429/17
6,656,622 B2 * 12/2003  Grasso ......................... 429/26

* cited by examiner

*Primary Examiner*—Michael Barr
(74) *Attorney, Agent, or Firm*—Cowan, Liebowitz & Latman, P.C.

(57) ABSTRACT

A fuel cell system containing a mixer/eductor for reducing the pressure difference between the gases in the anode and cathode-sides of a fuel cell stack. The mixer/eductor is placed at the mixing point between the anode tail or exhaust fuel gas and the fresh air or oxidant supply gas inlet. The incoming oxidant pressure is converted to a high momentum stream to form a suction on the fuel exhaust gas. This suction compensates for pressure losses in the gas piping and the oxidizer used to burn the exhaust fuel gas resulting in substantial balancing of the anode and cathode-side gas pressures. The mixer/eductor can be in the form of an axial or annular jet pump unit, both of which are advantageous in aggressively mixing the fuel exhaust gas with the incoming oxidant or air. The mixer/eductor geometry can be varied to provide the proper suction to balance pressures over a chosen range of operating conditions. Additionally, the incoming fresh air flow rate or an oxidant exhaust recycle flow rate can be varied to actively balance pressures at any operating point.

11 Claims, 6 Drawing Sheets

FUEL CELL SYSTEM WITH MIXER/EDUCTOR

BACKGROUND OF THE INVENTION

1. Field of the Invention

This invention relates to fuel cell systems employing fuel cell stacks having a pressure differential between the anode or fuel and cathode or oxidant sides of the stack and, in particular, to fuel cell systems of this type incorporating mechanisms for lessening this pressure differential.

2. Description of the Related Art

A fuel cell is a device which directly converts chemical energy stored in a fuel such as hydrogen or methane into electrical energy by means of an electrochemical reaction. This differs from traditional electric power generating methods which must first combust the fuel to produce heat and then convert the heat into mechanical energy and finally into electricity. The more direct conversion process employed by a fuel cell has significant advantages over traditional means in both increased efficiency and reduced pollutant emissions.

In general, a fuel cell, similar to a battery, includes a negative or anode electrode and a positive or cathode electrode separated by an electrolyte which serves to conduct electrically charged ions between them. In contrast to a battery, however, a fuel cell will continue to produce electric power as long as fuel and oxidant are supplied to the anode and cathode, respectively. To achieve this, gas flow fields are provided adjacent to the anode and cathode through which fuel and oxidant gases are supplied. In order to produce a useful power level, a number of individual fuel cells are stacked in series with an electrically conductive separator plate in between each cell.

In high temperature fuel cell stacks, it is desirable to minimize the pressure differential of the gases passing through the anode and cathode sides of the stacks. This is so because it is necessary in certain sections of the stack to provide seals to keep the fuel and oxidant gases isolated from each other. To create the required seals, surfaces, which is some cases sandwich a gasket, are mechanically forced together to realize an "acceptable" leak rate. This leak rate is a function of the pressure differential. Therefore, minimizing the pressure differential is important to prevent excessive leaks.

Keeping the pressure differential at a minimum has been achieved in past systems by attempting to cause the pressure of the oxidant gas at the inlet of the cathode-side of a stack to be equal to the pressure of the exhaust fuel gas at the exit of the anode-side of the stack. This has to be realized in the face of the other operating requirements which tend to make the pressures unequal.

In particular, in a fuel cell stack, fresh air usually serves as oxidant and is provided at the entry of the cathode-side of the stack. This fresh air is typically at ambient temperature and must be heated to the operating temperature of the stack. Heating of the air is conventionally accomplished by burning unused or exhaust fuel gas exiting from the anode-side of the stack in the incoming air. In terms of the process flow at the junction of the two streams, the gas pressure at the exit of the anode-side of the stack is coupled to the gas pressure at the inlet of the cathode-side of the stack. As such, the pressure at the exit of the anode-side is necessarily higher than the pressure at the inlet of the cathode-side by the amount required to overcome the pressure losses associated with any connection piping and with the oxidizer used to burn the gases.

Current fuel cell systems have used a variety of approaches in solving this differential pressure problem. One such approach, utilizes a high temperature booster blower placed between the exit of the anode-side of the stack and the mixing point to overcome the pressure loss of the connection piping and oxidizer. This has the advantage of independently controlling the pressure balance but adds significant cost and reliability issues to a commercial system. Another approach, uses a downstream, hot recycle blower to draw both the anode exhaust gas and fresh air oxidant gas through a mixing device and oxidizer. This system configuration allows the gas pressure at the inlet on the cathode-side to run higher than the gas pressure at the exit on the anode-side with some control over the difference. Disadvantages to this system are, again, the cost and reliability of the recycle blower as well as the overall complexity of the system hardware. A further approach to the problem is to simply allow the fuel pressure to run higher than the oxidant pressure. The experience in this case is that a multitude of operating problems can arise. Problems include non-uniform stack temperatures, reduced system efficiency and elevated exhaust pollutant emissions.

It is, therefore, an object of the present invention to provide a fuel cell system employing a fuel cell stack in which the differential pressure between the gas at the inlet of the cathode-side and the gas at the exit of the anode-side of the stack is reduced in a manner which avoids the above disadvantages.

It is a further object of the present invention to provide a fuel cell system employing a fuel cell stack in which the differential pressure between the gas at the inlet of the cathode-side and the gas at the exit of the anode-side of the stack is reduced in a simple and easy manner.

SUMMARY OF THE INVENTION

In accordance with the principles of the present invention, the above and other objectives are realized in a fuel cell system of the above-type in which a mixer/eductor is utilized in the system. The mixer/eductor receives the fresh oxidant or air to be fed to the inlet at the cathode-side of the stack and also receives the exhaust gas delivered from the exit of the anode-side of the stack. The mixer/eductor operates on and mixes these gases for passage through an oxidizer and subsequent delivery to the inlet at the cathode-side of the stack. In accord with the invention, the eductor/mixer operates on and mixes these gases such that the pressure difference between the gas at the exit of the anode-side of the stack and the gas at the inlet of the cathode-side of the stack is reduced. Also, additional control over the reduction of the difference in pressure is realized by controlling the flow rate of the supplied fresh air.

In a further aspect of the invention, a recycle blower is placed between the exit at the cathode-side of the stack and the mixer/eductor to provide additional control in reducing the differential pressure.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
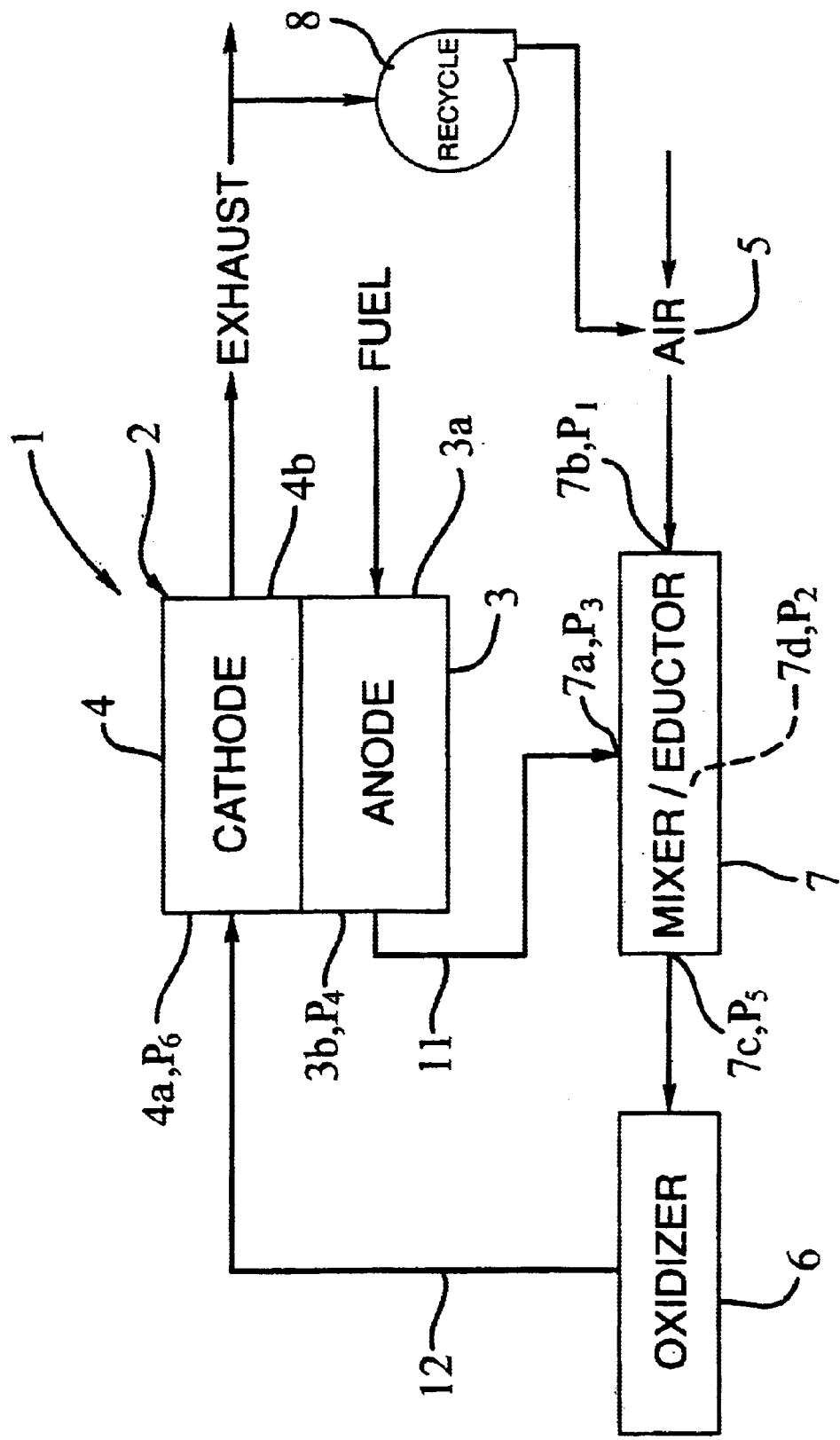
FIG. 1 shows a fuel cell system incorporating a mixer/eductor in accordance with the principles of the present invention.

FIG. 1 shows schematically a fuel cell system 1 in accordance with the principles of the present invention. As shown, the system 1 includes a fuel cell stack 2 having a fuel or anode-side 3 and an oxidant or cathode-side 4. The anode-side 3 includes an inlet 3a for supply of fresh fuel and an exit 3b for extraction of exhausted fuel. The cathode-side 4 also includes an inlet 4a for receiving oxidant and an exit 4b for expelling exhausted oxidant.

An oxidant source 5 supplies oxidant, shown as air, at a controllable flow rate or velocity to the system 1. The oxidant is heated by burning the oxidant in an oxidizer 6 with exhausted fuel carried by piping 11 from the exit 3b of the anode-side 3 of the stack 2. The oxidizer 6 is typically an oxidation catalyst bed. The resultant heated gas is supplied via piping 12 to the inlet 4a of the cathode-side 4 of the stack 2.

In order to keep the difference in pressure between the oxidant and fuel gases passing through the stack 2 at a minimum, the system 1 is adapted to reduce the pressure difference between the exhaust fuel gas at the exit 3b and the oxidant supply gas at the entry 4a. More particularly, this is realized, in accordance with the principles of the present invention, by the incorporation of a mixer/eductor 7 into the system 1. Specifically, the mixer/eductor is situated to receive at an inlet 7a the exhaust fuel gas from the exit 3b via the piping 1 1and the oxidant gas at an inlet 7b from the supply 5.

The mixer/eductor 7 is adapted to increase the velocity and decrease the pressure of the oxidant supply gas, thereby creating a vacuum. This vacuum decreases the pressure of the exhaust fuel gas at the point of entry 7a of the exhaust fuel gas to the mixer/eductor 7 and then the sucks the exhaust fuel gas through the mixer/eductor. The oxidant and exhaust fuel gases are thus mixed and the pressure of the mixed gas increased in passing through the mixer/eductor to the outlet 7c, which is coupled to the oxidizer 6. By suitable selection of the configuration of the mixer/eductor 7, the aforementioned decrease in pressure of the entering exhaust fuel gas and increase in pressure of the mixed gas is controlled such as to result in the gas pressure at the anode-side exit 3b being made substantially equal to the gas pressure at the cathode-side inlet 4a.

Figure 2:
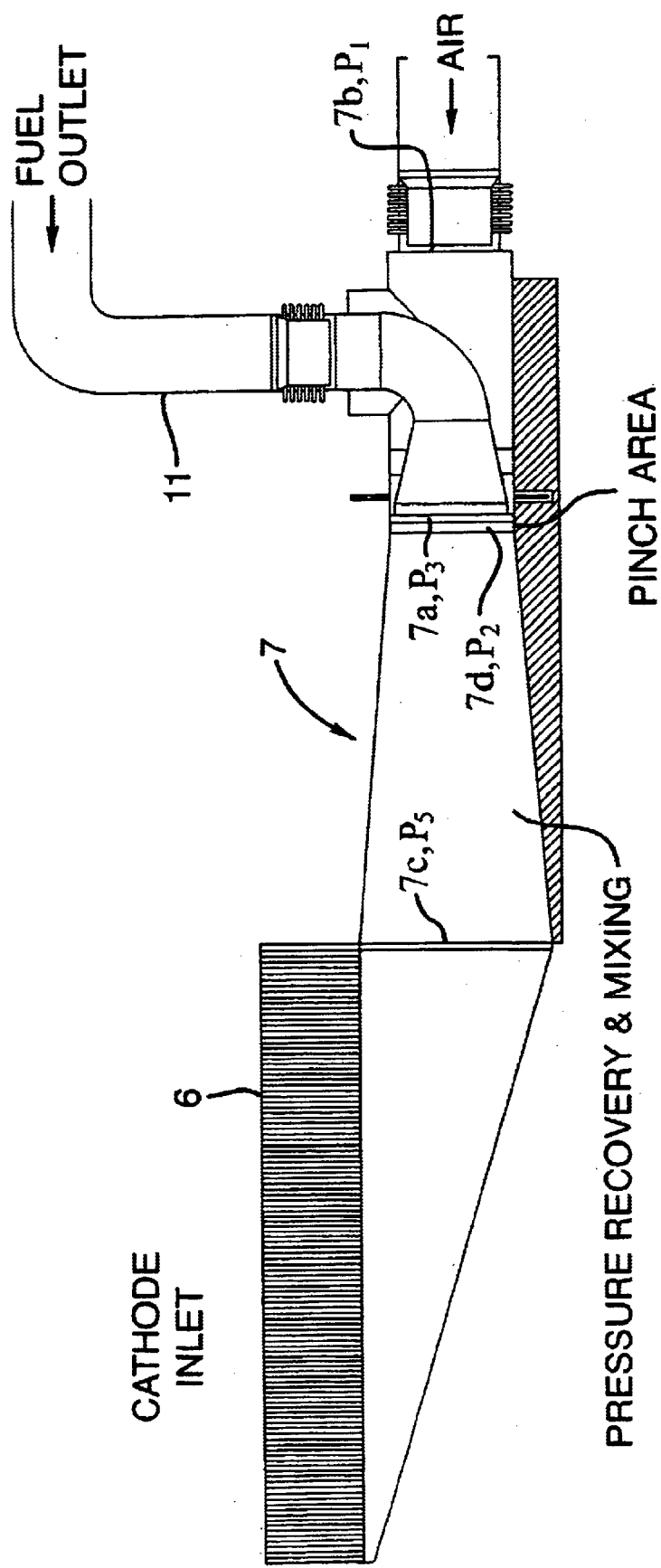
FIG. 2 shows an annular-type mixer/eductor usable as the mixer/eductor in the fuel cell system of FIG. 1.
Figure 3:
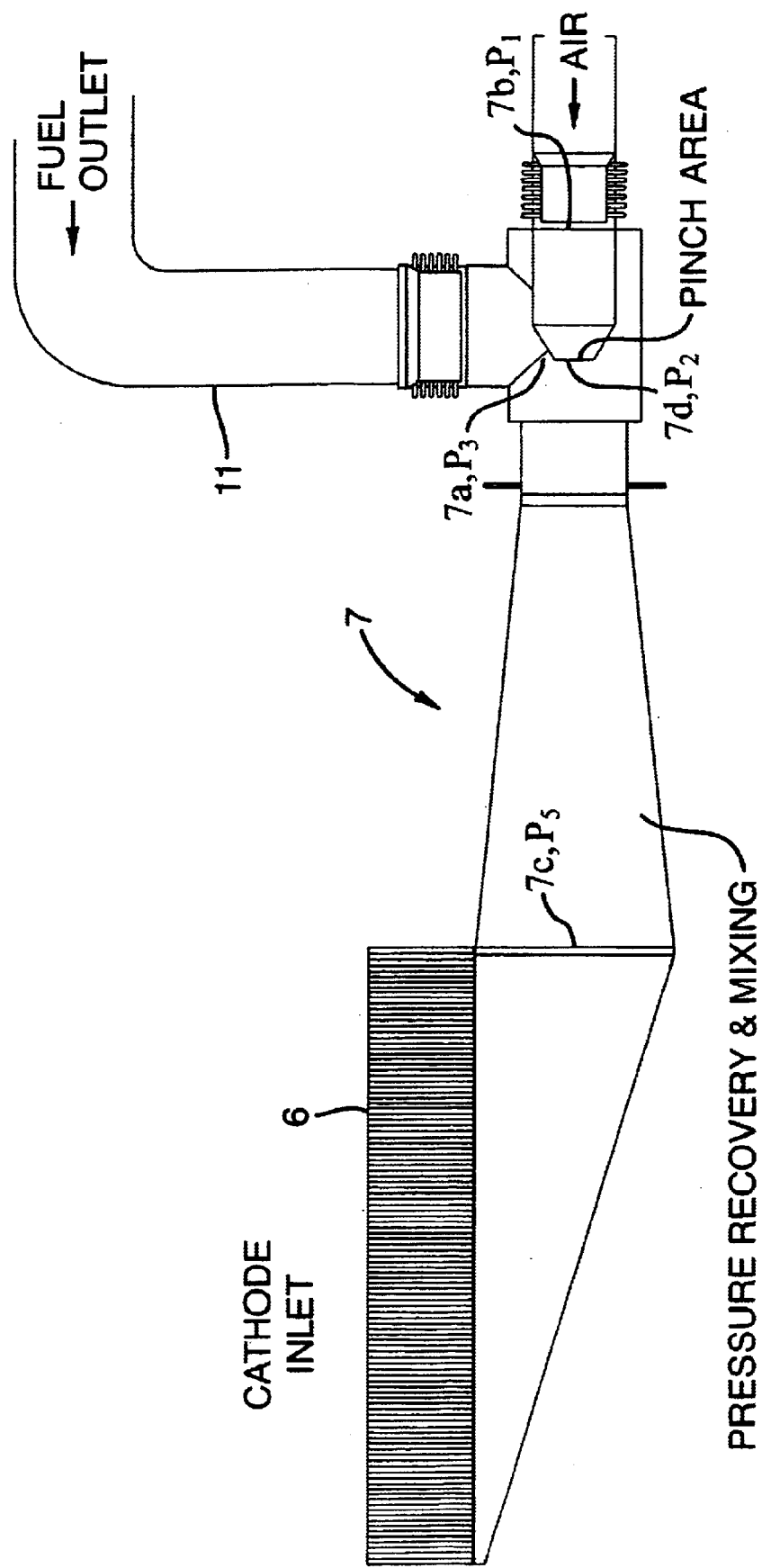
FIG. 3 shows an axial-type mixer/eductor usable as the mixer/eductor in the fuel cell system of FIG. 1.
Figure 6:
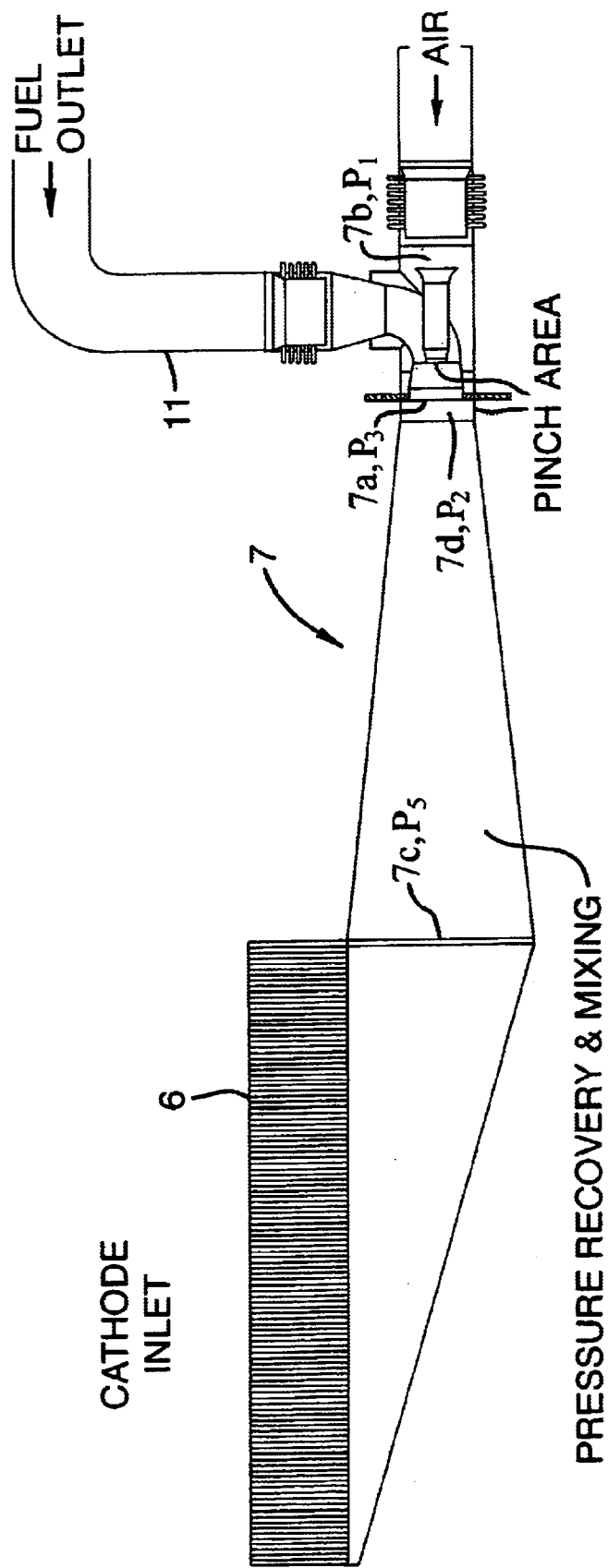
FIG. 6 shows an axial/annular-type mixer/eductor usable as the mixer/eductor in the fuel cell system of FIG. 1.

FIGS. 2, 3 and 6 show, respectfully, an annular-type mixer/eductor, an axial-type mixer/eductor and an axial/annular-type mixer/eductor usable as the mixer/eductor 7 of FIG. 1. In each of these units there is a conventional "pinch area" in which the incoming oxidant gas velocity and it's pressure are decreased to create a vacuum and adjacent which the exhaust fuel gas is introduced. Following the "pinch area" is a "pressure recovery and a mixing area" in which the gases are mixed and the pressure of the mixed gas increased. Mixer/eductor jet pump units of this type can be provided using standard design procedures to meet the requirements of the particular application.

In the axial mixer/eductor of FIG. 2, in the pinch area, oxidant from the supply 5 incoming at inlet 7b is pinched into an annular section 7d surrounding a circular opening forming the entry 7a. The cross-sectional area at the section 7d is chosen such that the static pressure $P_1$ of the incoming oxidant at the entry 7b is converted into an increased velocity, thereby reducing the static pressure to $P_2$ at the annular portion 7d. The well known Bernoulli equation describes this phenomena, $$P_1 + \frac{1}{2}\rho u_1^2 = P_2 + \frac{1}{2}\rho u_2^2 \qquad [1]$$

In Equation [1], P represents static pressure, ρ represents fluid velocity and ρ represents fluid density. The left side of equation [1] represents the total pressure available. If the velocity $u_2$ is increased, the static pressure $P_2$ must decrease in order for equation [1] to stay balanced. The reduced pressure $P_2$ translates into a reduced pressure $P_3$ (the pressure $P_3$ is substantially equal to the pressure $P_2$) at the entry point 7a of the exhaust fuel gas to the mixer/eductor and a reduced pressure $P_4$ at the exit 3b of the anode-side of the stack 2 (the pressure $P_4$ is equal to the pressure $P_3$ plus the pressure loss due to the tubing 11). In passing through the pinch area to the mixing and recovery area, the gases are mixed and the mixed gas pressure is raised to a pressure $P_5$ at the exit 7c.

In order to minimize the difference between the static pressure $P_4$ at the exit 3b and the static pressure $P_6$ at the inlet or entry 4a (the pressure $P_6$ is equal to the pressure $P_5$ minus the pressure losses due to the oxidizer 6 and tubing 12), the flow area at the annular portion 7d is selected to produce a velocity $u_2$ required to sufficiently reduce the static pressure $P_2$ This, in turn, translates into corresponding reductions in the static pressures $P_3$ and, therefore, $P_4$.

Figure 4:
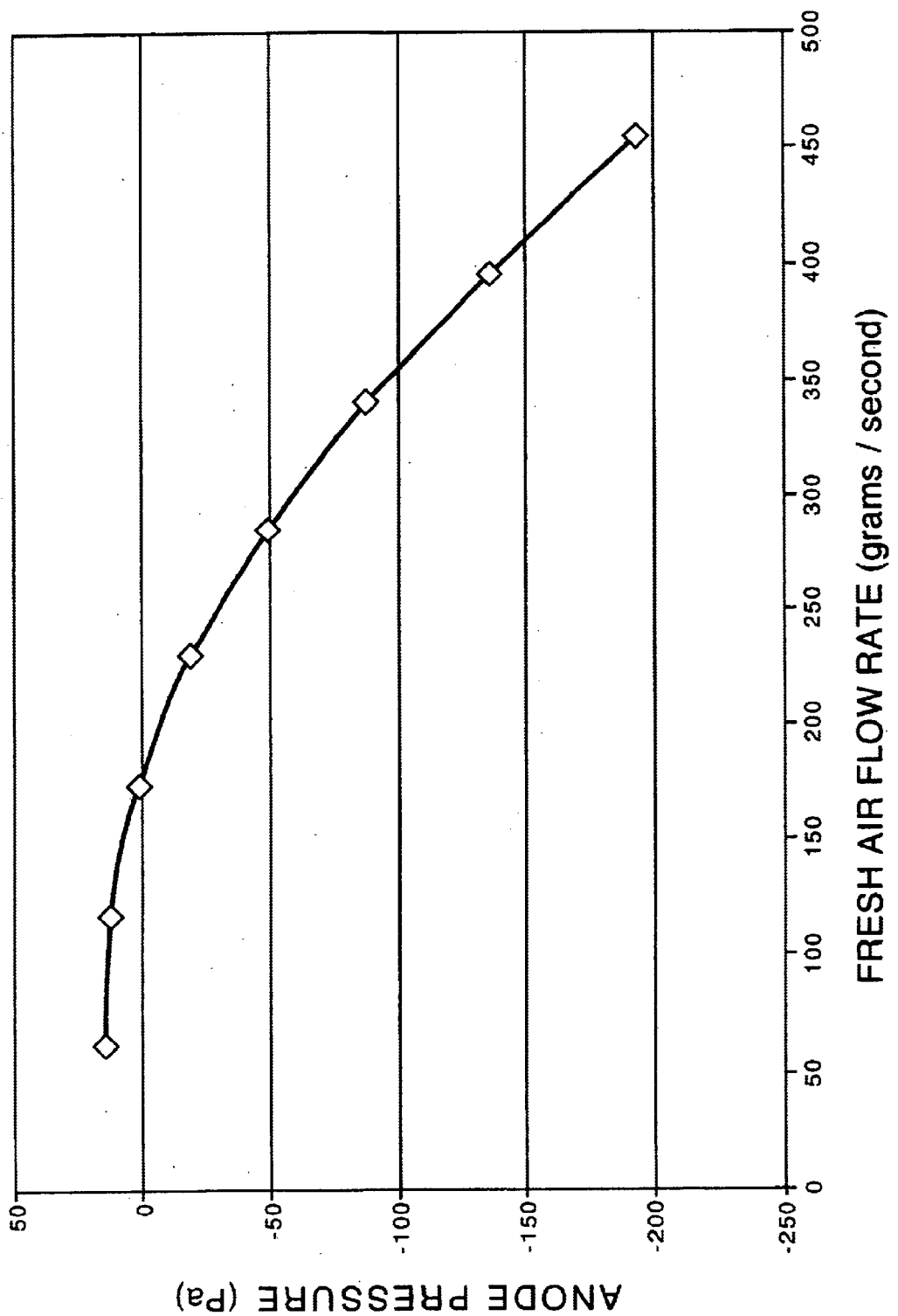
FIG. 4 shows a graph of the measured pressure of the exhaust gas from the exit of the anode-side of a fuel cell stack at the entry point to a mixer/eductor of the type shown in FIG. 2 as a function of oxidant air flow rate at the entry of the mixer/eductor.

FIG. 4 shows the pressure $P_2$ as a function of oxidant supply flow rate for a prototype mixer/eductor of the type in FIG. 2. The curve shows the characteristic parabolic shape expected from equation [1]. Adding a term to equation [1] to account for irreversible pressure loss gives, $$\left(P_1 + \frac{1}{2}\rho u_1^2\right) - \left(K_1 \cdot \frac{1}{2}\rho u_2^2\right) = \left(P_2 + \frac{1}{2}\rho u_2^2\right) \qquad [2]$$

Figure 5:
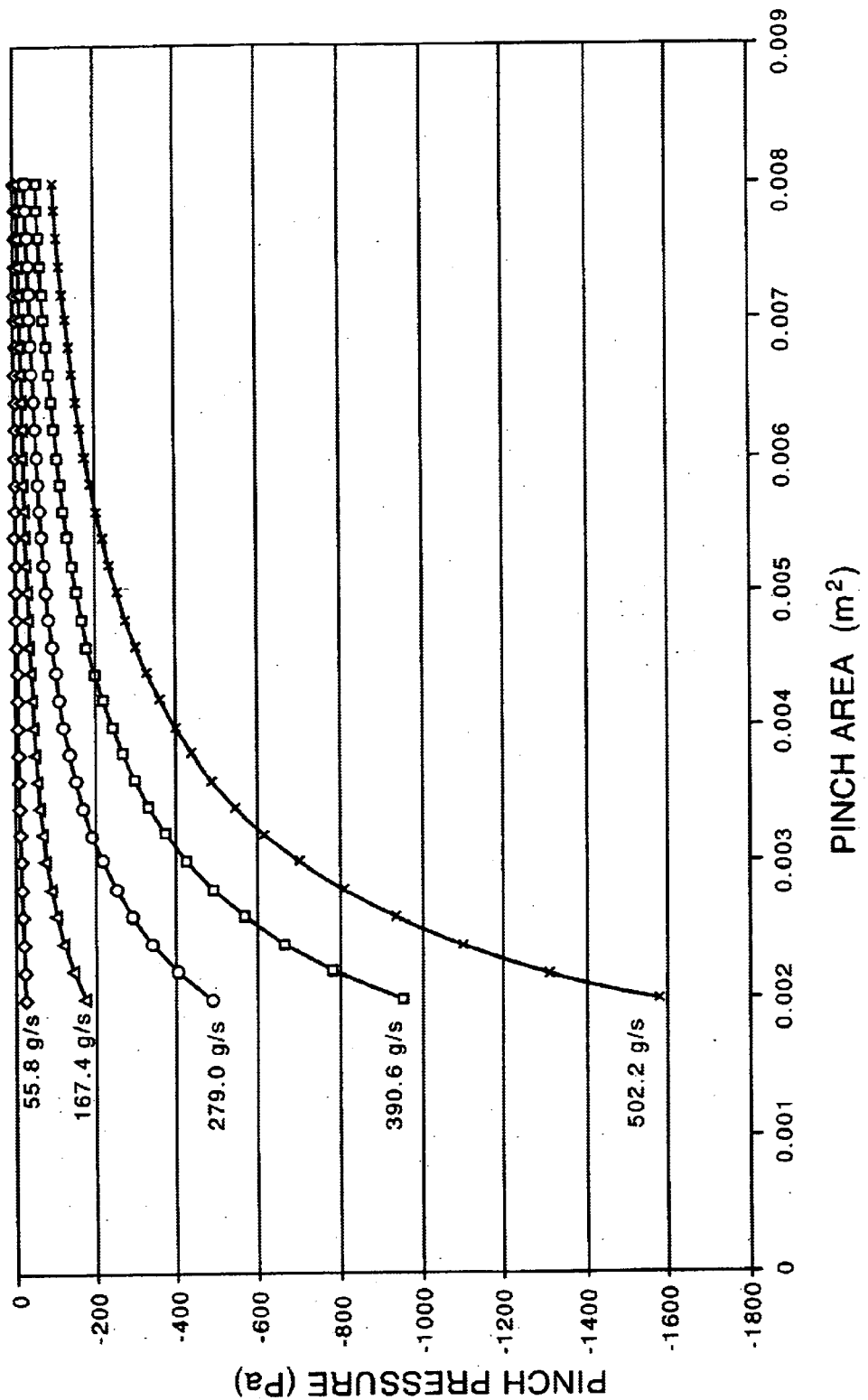
FIG. 5 shows predicted pinch pressure as a function of pinch flow area for a variety of air flow rates for the mixer/eductor of FIG. 2.

Here, $K_1$ is an empirical loss coefficient calculated using the data of FIG. 4. Using this loss coefficient, $P_2$ can be calculated over a range of areas for the annular section 7d (pinch throat areas) and air flow rates for the oxidant, generating the graph of FIG. 5. Using this graph, the area of the annular section 7d can be selected based on the expected air flow rate of the oxidant gas and required pressure, $P_2$, to balance the anode and cathode-side pressures ($P_4$ and $P_6$).

In the mixer/eductors of FIGS. 3 and 6, a similar procedure can be followed. In the FIG. 3 mixer/eductor, instead of an area of an annular section forming the pinch area, the area of a nozzle forms the pinch area and is selected to provide the desired reduction in the pressure $P_2$, to thereby balance the pressures $P_4$ and $P_6$. In the FIG. 6 mixer/eductor, the pinch area is formed by the combination of the area of an annular section as in the FIG. 2 mixer/eductor and the area of a nozzle as in the FIG. 3 mixer/eductor. In this case, these areas are selected so that together they provide the desired reduction in the pressure $P_2$, to thereby balance the pressures $P_4$ and $P_6$ It should be noted that additional control over reducing the difference in the pressures $P_4$ and $P_6$ can be effected by controlling the flow rate of the oxidant supply gas. Typically, this might be accomplished by including a controllable blower in the supply 5.

Additionally, in a further aspect of the invention, a recycle blower 8 is used to recycle exhaust oxidant gas from the exit 4b of the cathode-side of the stack to combine it with the oxidant from the supply 5. Again by controlling this blower to adjust the flow rate of the recycled exhaust oxidant gas, additional control in reducing the difference between the pressures $P_4$ and $P_6$ can be effected.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A fuel cell system comprising:

a fuel cell stack having an anode-side and a cathode-side, said anode-side having an inlet for receiving fuel and an exit for discharging exhaust fuel gas, and said cathode-side having an inlet for receiving oxidant gas and an exit for discharging exhaust oxidant gas;

a burner for burning oxidant and exhaust fuel gas and for delivering the resultant gas to the inlet of said cathode-side;

a mixer/eductor for operating on and mixing the exhaust fuel gas from said exit of said anode-side and a supply of oxidant gas and delivering the resultant mixture to said burner, said mixer/eductor being adapted to operate and mix said exhaust fuel gas and supply of oxidant gas such that the difference between the pressure of said exhaust fuel gas at the exit of the anode-side and the pressure of the oxidant gas at the inlet of the cathode-side is reduced.

2. A fuel cell system in accordance with claim 1, wherein:

said mixer/eductor has a pinch area for increasing the velocity and decreasing the pressure of the incoming oxidant gas, thereby creating a high pressure oxidant stream which produces a vacuum for the exhaust fuel gas.

3. A fuel cell system in accordance with claim 2, wherein:

said mixer/eductor further has a mixing and recovery area following said pinch area in which said high pressure oxidant stream and said exhaust fuel gas are mixed and the pressure of the resultant mixture is increased.

4. A fuel cell system in accordance with claim 3, wherein:

said pinch area is dimensioned so as to provide said reduction in pressure difference.

5. A fuel cell system in accordance with claim 4, further comprising:

an oxidant supply with a controllable flow rate for supplying oxidant to said mixer/eductor, and said flow rate is further controlled so as to provide said reduction in pressure difference.

6. A fuel cell system in accordance with claim 4, further comprising:

a recycle blower for recycling exhaust oxidant gas from said exit of said cathode-side for supplying oxidant to said mixer/eductor;

and said blower is further controlled so as to provide said reduction in pressure difference.

7. A fuel cell system in accordance with claim 1 wherein:

said mixer/eductor is an annular mixer/eductor.

8. A fuel cell system in accordance with claim 1 wherein:

said mixer/eductor is an axial mixer/eductor.

9. A fuel cell system in accordance with claim 1 wherein:

said mixer/eductor is an axial/annular mixer/eductor.

10. A fuel cell system in accordance with claim 1, further comprising:

an oxidant supply with a controllable flow rate for supplying oxidant to said mixer/eductor;

and said flow rate is further controlled so as to provide said reduction in pressure difference.

11. A fuel cell system in accordance with claim 1, further comprising:

a recycle blower for recycling exhaust oxidant gas from said exit of said cathode-side for supplying oxidant to said mixer/eductor;

and said blower is further controlled so as to provide said reduction in pressure difference.

* * * * *

UNITED STATES PATENT AND TRADEMARK OFFICE
CERTIFICATE OF CORRECTION

PATENT NO. : 6,902,840 B2
DATED : June 7, 2005
INVENTOR(S) : Scott Blanchet et al.

It is certified that error appears in the above-identified patent and that said Letters Patent is hereby corrected as shown below:

<u>Column 4,</u>
Line 16, delete "ρ represents" and insert -- u represents --.
Line 36, delete "pressure P$_2$" and insert -- pressure P$_2$. --.

Signed and Sealed this

Seventh Day of March, 2006

JON W. DUDAS
*Director of the United States Patent and Trademark Office*